June 8, 1965   C. W. MUSSER   3,187,862
CLUTCH MECHANISM WITH FLEXSPLINE
Filed Oct. 22, 1962   2 Sheets-Sheet 1
Fig. 1
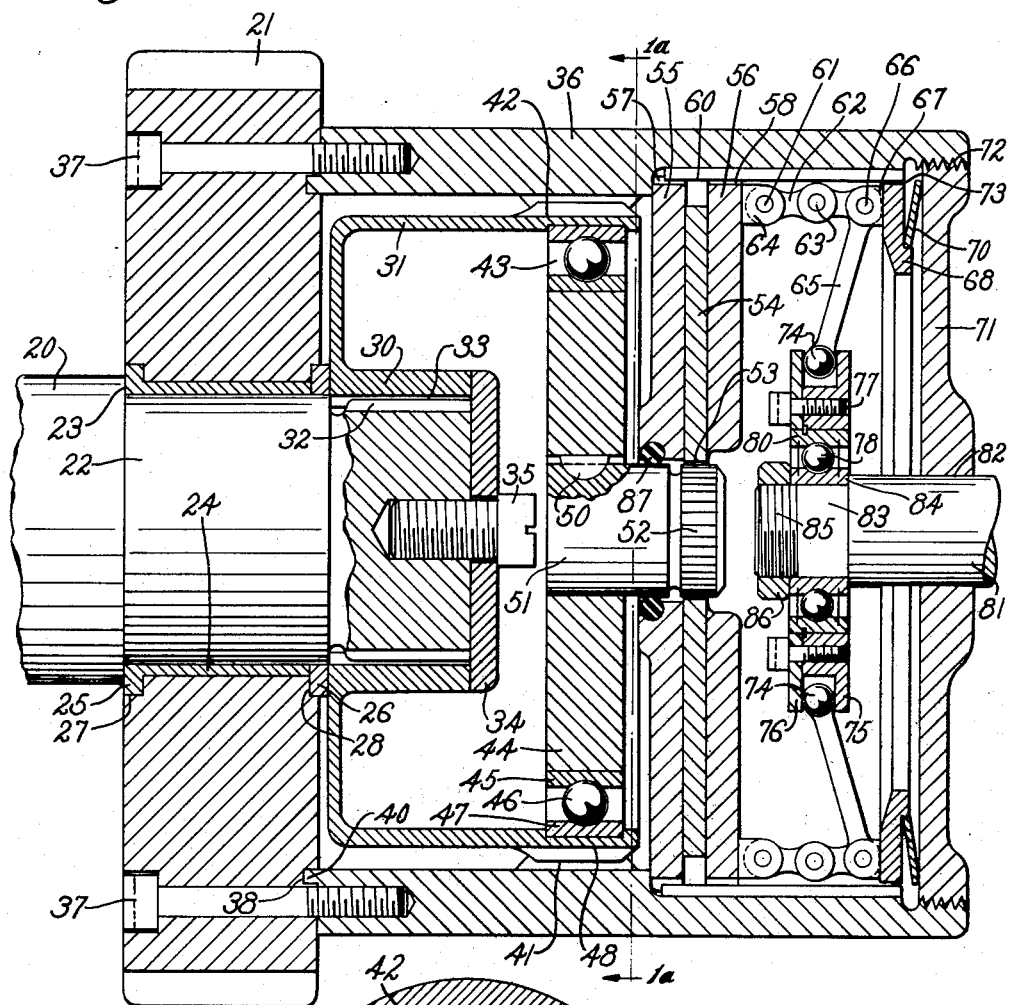
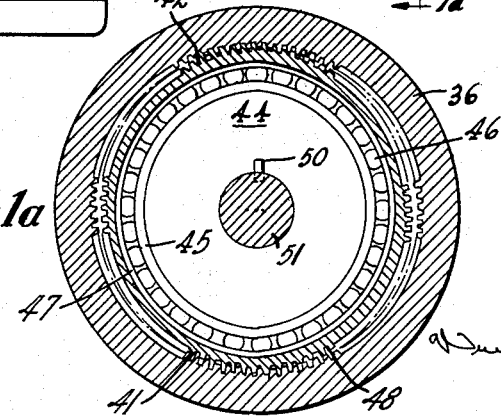
Fig. 1a
Inventor
C. Walton Musser
By his Attorney

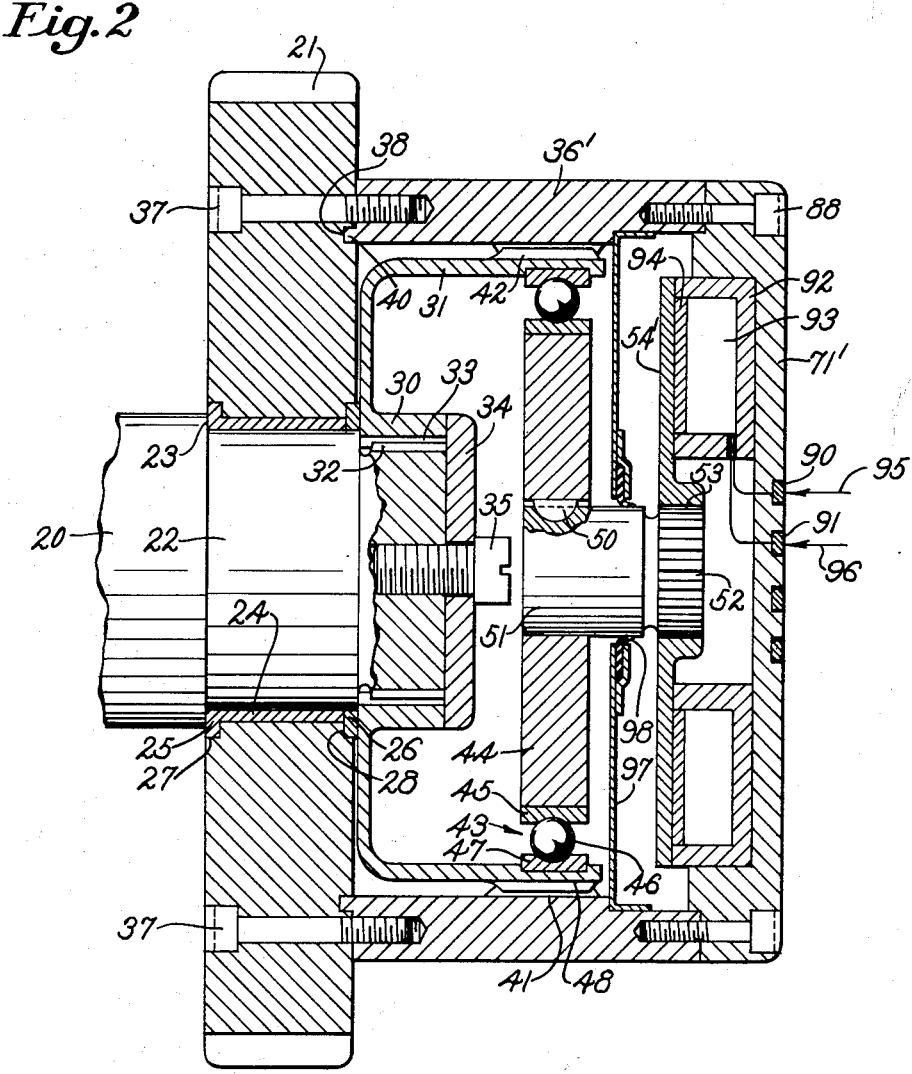

United States Patent Office 3,187,862
Patented June 8, 1965

3,187,862
CLUTCH MECHANISM WITH FLEXSPLINE
C Walton Musser, Palos Verdes Estates, Calif., assignor to United Shoe Machinery Corporation, Boston, Mass., a corporation of New Jersey
Filed Oct. 22, 1962, Ser. No. 231,983
4 Claims. (Cl. 192—30)

The present invention relates to a clutch mechanism, and especially to a clutch mechanism of small size which is capable of transmitting high torque.

A purpose of the invention is to transmit high torque through a small clutch by employing a speed increasing unit to reduce the high torque to a lower level and then using a standard clutch to control the low torque output.

A further purpose is to employ a harmonic drive speed increasing device to connect to a clutch interposed in the system, and to operatively connect the clutch to the output or disconnect the clutch from the output as desired.

A further purpose is to connect the wave generator of a harmonic drive to one side of a clutch and to connect an output to the other side of the clutch.

Further purposes appear in the specification and in the claims.

In the drawings I have chosen to illustrate a few only of the numerous embodiments in which the invention may appear, selecting the forms shown from the standpoints of convenience in illustration, satisfactory operation, and clear demonstration of the principles involved.

FIGURE 1 is an axial section through one embodiment of the device of the invention, using a mechanical clutch.

FIGURE 1a is a transverse section of FIGURE 1 on the line 1a—1a.

FIGURE 2 is an axial section through a modified device of the invention, utilizing a magnetic clutch.

There is a demand in the art for a small size clutch which will transmit high torque. This has been accomplished in the present invention by introducing a speed increasing unit to reduce the high torque to a considerably lower level and then permit the employment of a standard clutch to control the torque output at the lower level.

As an example, let us assume that it is desired to engage and disengage a large gear from a shaft on which it is mounted. At the present time the only clutches which are available for high torque applications are very large in size in order to permit transmitting the necessary torque through a friction device. Generally, clutches operate by frictional engagement, and because of the coefficient of friction and the forces involved, they tend to become very large when high torques are to be transmitted.

The device of the invention is believed to have its widest application in slow speed machinery where it is desired to engage and disengage some moving element such as a gear, a roller, or the like.

In the preferred embodiment of the device of the invention, a driving shaft for example may connect to an output gear through a harmonic drive speed increaser having, for example, a ratio of 100:1. The driving shaft can be engaged and disengaged from the gear by controlling a high speed shaft of the speed increaser. From the standpoint of efficiency, the torque level on this high speed shaft is less than $1/100$ that of the torque between the input shaft and the gear directly. As a consequence, the clutch used can be relatively small, and yet it can operate effectively to control the engagement and the disengagement of the driving shaft to the gear.

The device of the invention is primarily intended for relatively slow moving machinery, but this limitation is not disadvantageous because most high torque level devices are used with relatively slow moving machinery. This restriction is imposed by the use of the speed increaser in the clutch system. For example, if the speed increaser has a speed ratio of 100:1 and the input shaft were turning at 100 revolution per minute, when the clutch is disengaged the wave generator or other output of the speed increaser would be turning at a speed of 10,000 r.p.m. For many purposes this speed is acceptable, but speeds greatly in excess of 10,000 r.p.m. may exceed the practical DN values for the wave generator bearings.

Considering first the device of FIGURE 1, the input shaft 20 drives the output gear 21 through a harmonic drive speed increaser unit in this embodiment. The shaft is reduced in diameter at 22 to provide a shoulder 23 and the reduced diameter portion of the shaft is surrounded by a journal bearing 24 of suitable anti-friction material having a flange 25 at one end and also surrounded at the other end by a thrust washer 26. The gear is journalled on the journal bearing 24 and has grooves 27 and 28 to engage the flange 25 and the thrust washer 26 respectively. The shoulder 23 axially positions the bearing and the gear in one direction and the thrust washer and the gear are axially positioned from the other direction by hub 30 of a flexspline 31 which is held in place on reduced spline end 32 on the shaft engaging internal splines 33 on the hub 30 and by cap 34 and screw 35 threaded into the end of the shaft. To avoid confusion with the flexsplines as later described, it should be noted that the splines 32 and 33 may be standard circular SAE splines of any well known character and merely serve to key the flexspline on the input shaft 20.

The harmonic drive has a housing 36, suitably circular in transverse section, which is held concentrically on the output gear 21 by cap screws 37 which are suitably countersunk. The gear has a groove 38 in the side into which a protruding rim 40 on the housing extends to aid in locating the housing properly.

The housing has concentric with the axis internal circular spline teeth 41 suitably integral with the housing and functioning as the circular spline of the harmonic drive unit, whose operation will generally be understood by reference to my United States Patents Nos. 2,906,143; 2,929,266; 2,930,250; 2,931,248; 2,931,249; 2,932,986; 2,942,513; 2,959,065, and 2,983,162. The flexspline telescopes within the circular spline and has around its outer circumference a set of external spline teeth 42 of the same tooth form as the internal circular spline teeth 41. The flexspline teeth, however, are only engaged with the circular spline teeth 41 at a plurality of circumferential spaced points, while they are out of engagement and out of mesh with the circular spline teeth at intermediate points as is described in my patents above referred to. At the intermediate points the flexspline teeth are out of engagement and out of mesh with the circular spline teeth. In the particular view shown it is contemplated that the major axis of an elliptoid is in the plane of the paper and therefore the teeth are in engagement in the plane of the paper and out of engagement at intermediate points.

The number of teeth on the flexspline and the circular spline will differ by a number which is equal to the number of the spaced points in which the teeth of the flexspline engage the circular spline or a multiple thereof. In this case, as known from my previous patents, a difference in the number of teeth of two will be suitable.

The flexspline is deflected into engagement with the circular spline by a wave generator 43, which suitably in the present case deflects the flexspline into an elliptoidal shape so that the flexspline teeth engage the circular spline teeth at the major axis. The wave generator 43 is made elliptoidal in shape as in harmonic drives for rotary-to-rotary increaser units. The wave generator has an elliptoidal cam 44 which has pressfitted on the outside an elliptoidal bearing race 45 forming the inner race of an elliptoidal ball bearing including rolling elements 46 (preferably balls) which run in the inside of an outer elliptoidal race 47. The outer elliptoidal race fits in an internal groove 48 in the interior of the wave generator which is suitably sufficiently shallow to permit the outer race 47 to be snapped into place in the process of assembly. Of course, the outer race can be held in the interior of the elliptoidal wave generator in any other suitable manner.

The wave generator cam 44 is keyed at 50 as by a Woodruff key on a clutch plate shaft 51 which is concentric with the common axis. Normally the clutch plate shaft will be press-fitted into the wave generator cam 44 and the key 50 is only shown in the present installation to make very clear that the parts are rotatively locked together.

The clutch plate shaft 51 has concentric external splines 52 which may suitably be standard SAE splines of any well known character. The splines 52 engage internal splines 53 on the inside of clutch plate 54. The clutch plate 54 fits between axially fixed reaction plate 55 and axially movable reaction plate 56, which have external spline teeth 57 and 58 respectively engaging internal spline teeth 60 on the housing of the clutch. These external and internal spline teeth are suitably standard SAE splines of any well known character. Because of this spline engagement, the reaction plates 55 and 56 are rotationally fixed to the housing to rotate with the housing 36 which turns with the output gear 21. The movable reaction plate 56 is axially moved back and forth by a toggle system of any well known type. In this illustrated embodiment the movable reaction plate 56 at a plurality of circumferentially spaced points is pivotally connected by pins 61 to toggle link 62 which pivotally connects at the opposite end to pin 63. Pins 61 are held by pad 64. Pin 63 interconnects to bell crank lever 65 which has a pivotal mounting in pin 66 held in pad 67 on annular plate 68.

The plate 68 is spring-loaded axially by Belleville spring 70 acting against end closure 71 threaded at 72 into the housing 36.

The number of toggle lever arrangements which will be distributed around the circumference will vary with the size of the device, but usually 6 or 8 will be used. The spring-loaded plate 68 has spline teeth 73 at the outer circumference which engage in the spline 60 in the housing and prevent rotation so that the spring-loaded plate 68 will remain in proper relative relation to the movable reaction plate 56, although, of course, it turns with the housing. Spline teeth 73 are standard SAE spline teeth.

The Belleville spring 70 or other suitable spring should be relatively stiff since it is intended to avoid the need for precise adjustment of the end plate 71. The pressure on the Belleville spring can be adjusted by screwing in the end plate or backing it off in the threads in the housing. Hence the rapidity of starting and the maximum transmissible torque can be adjusted by adjustment of the end plate 71.

The clutch plate 54 is between two reaction plates 55 and 56 and so will function as a multiple disc clutch so that the clutch plate and the reaction plates will move at the same angular speed when they are engaged.

The inner ends of the toggle levers 65 have ball enlargements 74 which engage within a clutch yoke 75 in a suitable race closed at the opposite side by a yoke cover 76 held in place by cap screw 77. The clutch yoke cover also retains the outer race of the clutch throw-out bearing 78 by capturing snap ring 80 between the clutch yoke 75 and the clutch yoke cover 76.

The clutch throw-out bearing 78 may be a standard ball bearing with suitable shields to prevent dirt from the clutch plate from entering the bearing. The clutch throw-out bearing 78 is fastened to a concentric throw-out shaft 81 movable in or out and guided by a suitable fit in opening 82 in the cover. The shaft has a reduced end 83 providing a shoulder 84 which receives and holds the inner race of the bearing and is threaded at 85 to receive bearing retaining nut 86. Hence, as the throw-out shaft moves axially to the right in FIGURE 1 it will cause the toggle lever 65 and the toggle link 62 to relieve the pressure of the movable reaction plate 56 against the clutch plate 54. Hence, when this clutch throw-out shaft 81 is moved to the right in FIGURE 1, the clutch is disengaged and the wave generator 43 is free to rotate.

In order to keep dirt from the wearing clutch from getting into the harmonic drive a seal 87 is provided between the fixed reaction plate 55 and the clutch plate shaft 51.

It will then be evident that when the throw-out shaft 81 has been moved to the right to disengage the clutch, as the input shaft 20 rotates, it causes the flexspline to rotate. Assuming that there is torque applied to the output gear 21, the wave generator 43 is free to rotate since the clutch is disengaged and as a consequence rotation of the input shaft 20 will cause the wave generator 43 to rotate instead of rotating the output gear 21 against the output torque.

However, when the throw-out shaft 81 is placed in the position shown in FIGURE 1, i.e., with the clutch engaged, the wave generator cannot rotate relative to the output and is fixed with respect to the output gear 21 and must turn with it. Under this condition the input shaft 20 rotates the flexspline and causes the hub 30 to rotate directly at the speed of the input shaft and this will cause the output gear 21 to rotates at the same speed as the input shaft 20. In other words, when the clutch is engaged all members of the unit except the throw-out shaft 81 will be rotating at the input shaft velocity.

In FIGURE 1 I illustrate a mechanical means for engaging and disengaging the clutch. In FIGURE 2 an electrical means is illustrated as an alternate. Here all parts serve the same function as in FIGURE 1 except for the differences noted in respect to the clutch. The housing 36' is somewhat shorter than in FIGURE 1 and the cover plate 71' is held in place by cap screws 88. The cover plate 71' is made from a suitable non-magnetic material or a plastic as desired and it is assumed that in the case of the present invention the cover plate 71' is of non-magnetic electrical insulating material so that two collector rings 90 and 91 concentric with the axis can be imbedded in the plastic as by molding and electrically connected as by pigtails shown.

Fastened to the cover plate by suitable means not shown is a toroidal electromagnet 92 having a toroidal electrically conducting magnet winding 93 and having a cover plate 94. In this version the clutch plate 54' is of magnetic material and as the electromagnet winding 93 is energized by feeding current in through the external contactors or brushes 95 and 96 to the collector rings and from the collector rings to the magnet wiring it will cause the clutch plate 54' to be withdrawn against the toroidal magnet 92 and function exactly the way the mechanical clutch did in FIGURE 1. It is not intended to illustrate an electromagnet clutch which is in any way special or unusual and there are various other electromagnetic clutches which can operate for the purposes of the invention. In one type well known and not illustrated, permanent magnets are used and a counter electro-motive force is employed to deenergize and this type of device can be employed if desired. The particular electromagnetic clutch employed will depend upon the desired characteristics. The device of FIGURE 2 has the advantage that it fails safe automatically. In the form of FIGURE 2 a dust seal 97 having a sealing gasket 98 is provided between the clutch and the harmonic drive.

In view of my invention and disclosure variations and modifications to meet individual whim or particular need will doubtless become evident to others skilled in the art, to obtain all or part of the benefits of my invention without copying the structure shown, and I therefore claim all such insofar as they fall within the reasonable spirit and scope of my claims.

Having thus described my invention what I claim as new and desire to secure by Letters Patent is:

1. In clutch mechanism, input means, output means, a harmonic drive speed increaser operatively connected between the input means and the output means and comprising a circular spline having a plurality of circumferentially distributed teeth, a flexspline in telescoping relation to the circular spline and having a plurality of circumferentially distributed teeth of the same tooth form on the side toward the circular spline, the number of teeth on the circular spline and on the flexspline being different, the teeth on the flexspline being in contact with the teeth on the circular spline at a plurality of circumferentially spaced points with intermediate points at which the respective teeth are out of mesh and out of contact, the difference in the number of teeth on the circular spline and on the flexspline being the same as or a multiple of the number of spaced points at which the respective teeth are in contact, and a wave generator acting on the opposite side of the flexspline from the circular spline and deflecting its teeth into contact with those of the circular spline, one of the circular spline, flexspline and wave generator being connected to the input means, another of them being connected to the output means and the third of them being capable of turning freely at a substantially greater speed than the input means or optionally of being connected to the output means, and clutch means operatively connected between the said third element and the output means, and adapted to be disconnected to allow the third element to turn freely.

2. A clutch mechanism of claim 1, in which the clutch means is interconnected between the wave generator and the output means.

3. A clutch mechanism of claim 1, in which the clutch means is mechanically operated.

4. A clutch device of claim 1, in which the clutch means is electrically operated.

References Cited by the Examiner

UNITED STATES PATENTS

| 2,722,303 | 11/55 | Utz. | |
| 2,932,986 | 4/60 | Musser | 74—640 |
| 2,983,162 | 5/61 | Musser | 74—640 |
| 2,985,037 | 5/61 | Schoenle et al. | |
| 3,088,333 | 5/63 | Musser | 74—640 |

FOREIGN PATENTS 426,368   4/35   Great Britain.

DAVID J. WILLIAMOWSKY, *Primary Examiner.*